Sept. 11, 1923.  
L. M. SARTAIN  
LOCK NUT  
Filed Feb. 9, 1922
1,467,688
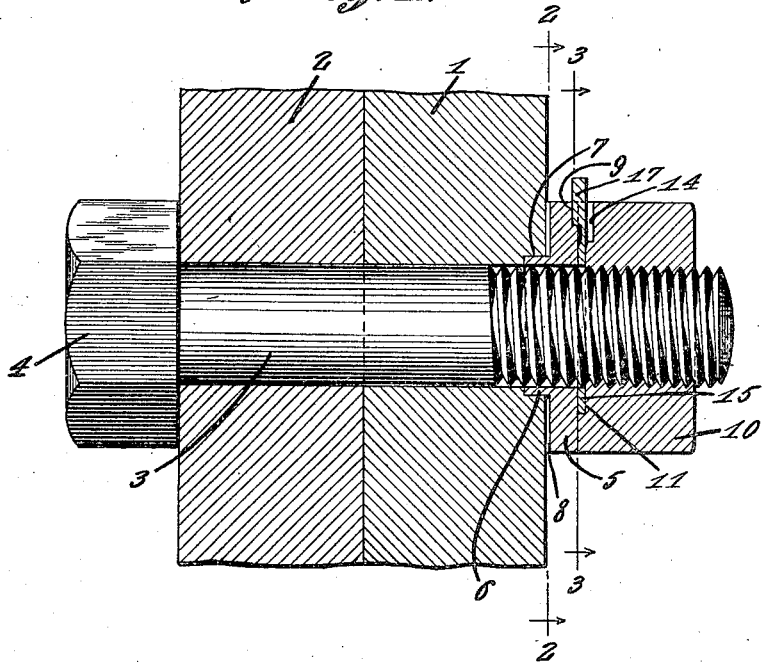
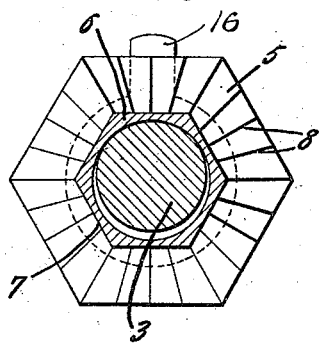
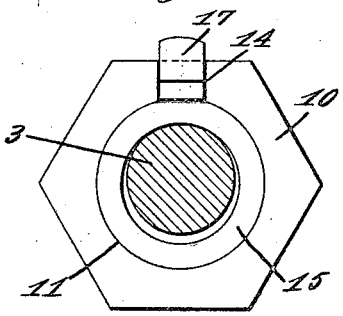
L. M. Sartain, Inventor
By _____ Attorney Patented Sept. 11, 1923.

1,467,688

UNITED STATES PATENT OFFICE.

LOUIS MARTAIN SARTAIN, OF PELHAM, TENNESSEE.

LOCK NUT.

Application filed February 9, 1922. Serial No. 535,320.

*To all whom it may concern:*

Be it known that I, LOUIS M. SARTAIN, a citizen of the United States, residing at Pelham, in the county of Grundy and State of Tennessee, have invented a new and useful Lock Nut, of which the following is a specification.

This invention aims to provide a simple means for locking a nut on a bolt, without working any changes in the standard form of the bolt.

It is within the province of the disclosure to improve generally and to enhance the utility of devices of that type to which the invention appertains.

With the above and other objects in view, which will appear as the description proceeds, the invention resides in the combination and arrangement of parts and in the details of construction hereinafter described and claimed, it being understood that, within the scope of what is claimed, changes in the precise embodiment of the invention shown can be made without departing from the spirit of the invention.

In the accompanying drawings:—

Figure 1 shows in section, a device constructed in accordance with the invention, the bolt appearing in elevation; Figure 2 is a section on the line 2—2 of Figure 1; Figure 3 is a section on the line 3—3 of Figure 1.

The numerals 1 and 2 denote two pieces of material held together by a bolt 3 having a head 4 engaging the piece 2. A washer 5 surrounds the bolt 3 but is not threaded thereon. Any suitable means may be provided for holding the washer 5 against rotation. Thus, the washer 5 may have a polygonal neck 6 received in a correspondingly shaped opening 7 in the piece 1. The washer 5 may be provided with a roughened surface of any desired sort, adapted to engage the piece 1. The roughened surface of the washer may comprise radial ribs 8. The neck 6 and the correspondingly shaped opening 7 may be omitted if desired. A nut 10 is threaded on the bolt 3. In its inner surface, the nut 10 has an annular seat 11. A notch 14 is formed in the edge of the nut 10 and communicates with the seat 11. The notch 14 is deeper than the seat 11. A ring 15 is received in the seat 11 of the nut 10 and has a resilient tongue 16 provided with a transversely projecting head 17. The tongue 16 and the head 17 are received in the notch 14. The tongue 16, owing to its resiliency, tends to hold the head 17 of the tongue 16 engaged with the recess 9 of the washer 5. The ring 15 therefore cannot rotate with respect to the washer 5. The nut 10 cannot rotate with respect to the ring 15, because the tongue 16 and the head 17 are received in the notch 14 of the nut 10. The construction, obviously, is such that the nut will be held securely against turning. When it is desired to release the nut 10, the tongue 16 may be sprung outwardly into the notch 14, thereby disengaging the head 17 from the recess 9 in the edge of the washer 5, the head 17 projecting beyond the periphery of the washer 5 and beyond the periphery of the nut 10 as shown in Figures 1 and 2, so that the tongue can be manipulated readily to disengage the head 17 from the recess 9.

Briefly considered, the device comprises, in a nut lock, a bolt 3; a washer 5 on the bolt and provided in its edge with a recess 9; means such as the parts 8 or 6 for holding the washer 5 against rotation; a nut 10 threaded on the bolt 3 and supplied with an annular seat 11, and with a notch 14 in its edge, the notch 14 being deeper than the seat 11 and communicating therewith; and a ring 15 received in the seat 11 of the nut 10, the ring 15 comprising a spring tongue 16 having a transversely projecting head 17, the tongue 16 and the head 17 being received in the notch 14 of the nut 10, the head 17 being held engaged with the recess of the washer 9 by the resiliency of the tongue 16, the resiliency of the tongue 16 permitting the tongue 17 to retire into the notch 14 of the nut 10, thereby disengaging the head 17 from the recess 9 of the washer 5.

What is claimed is:—

In a nut lock, a bolt, a washer on the bolt and provided in its edge with a recess, the inner surface of the washer being provided with radial ribs, and the washer having a projecting polygonal neck, the neck and the ribs coacting with the material through which the bolt passes to hold the washer against rotation, a nut threaded on the bolt and provided in its inner surface with an annular seat, the nut being supplied in its inner surface with a notch, the notch being deeper than the seat and communicating therewith, and a ring received in the seat of the nut, the ring including a spring tongue having a transversely projecting head, the tongue and the head being received in the notch of the nut, and the head being engaged with the recess of the washer by the resiliency of the tongue, the notch of the nut being adapted to receive the tongue, thereby to disengage the head from the recess of the washer.

In testimony that I claim the foregoing as my own, I have hereto affixed my signature in the presence of two witnesses.

LOUIS MARTAIN SARTAIN.

Witnesses:
 JAMES LOUIS ROLLINGS,
 LOUIS F. TRULTS.